United States Patent
Torrens-Burton (10) Patent No.: US 8,321,231 B2
(45) Date of Patent: Nov. 27, 2012

(54) METHOD AND APPARATUS FOR PROVIDING CUSTOMIZED SOUVENIR IMAGES

(75) Inventor: Patricia A. Torrens-Burton, Rochester, MN (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 2587 days.

(21) Appl. No.: 10/045,134

(22) Filed: Nov. 7, 2001

(65) Prior Publication Data

US 2003/0086123 A1 May 8, 2003

(51) Int. Cl.
*G06Q 10/00* (2012.01)
(52) U.S. Cl. ........................................ 705/1.1
(58) Field of Classification Search .................. 705/1.1
See application file for complete search history.

(56) References Cited

U.S. PATENT DOCUMENTS

| | | | |
|---|---|---|---|
| 5,687,087 A | 11/1997 | Taggart | 364/479.03 |
| 5,694,514 A | 12/1997 | Evans et al. | 386/46 |
| 5,864,651 A | 1/1999 | Lavie et al. | 395/114 |
| 6,532,345 B1 | 3/2003 | Gluck | |
| 6,698,943 B2 | 3/2004 | Gluck | |
| 6,892,388 B1 * | 5/2005 | Catanoso | 725/105 |
| 7,077,581 B2 | 7/2006 | Gluck | |
| 2003/0023452 A1 | 1/2003 | Novais et al. | |

FOREIGN PATENT DOCUMENTS

WO WO0004711 1/2000

OTHER PUBLICATIONS

Bates, et al., Patent Application END920010062US1, U.S. Appl. No. 09/934,913, "System and Method for Selecting Arena Seat Locations for Display", filed Aug. 22, 2001.
https://www.findafanphotos.com/main/php, "FindAFan, LLC", viewed Oct. 16, 2006, printed Nov. 8, 2006.

* cited by examiner

*Primary Examiner* — Dennis Ruhl
*Assistant Examiner* — Carrie Gilkey
(74) *Attorney, Agent, or Firm* — Roy W. Truelson; Grant A. Johnson (57) ABSTRACT

A method and system that captures and delivers customized souvenir images to a plurality of attendees at a sporting event, music concert, and the like. Individuals wanting to receive a copy of these images provide location information, such as their assigned seat number. The present invention uses this information to identify the proper image and deliver it to the customer. Embodiments of the present invention may be adapted for use in a kiosk and to deliver the picture over a computer network, such as the Internet.

24 Claims, 7 Drawing Sheets

METHOD AND APPARATUS FOR PROVIDING CUSTOMIZED SOUVENIR IMAGES

FIELD OF THE INVENTION

The invention generally relates to image capture and delivery devices. More particularly, the present invention relates to a method and apparatus for creating and delivering customized souvenir photographs, video clips, and the like, showing a customer at an event site.

BACKGROUND OF THE INVENTION

Attendees of sport events and music concerts enjoy seeing themselves on the event site's scoreboard ("Jumbotron"). Unfortunately, they often miss the footage because it is only displayed temporarily.

Attendees of sport events and music concerts also often desire a souvenir photograph or video clip that memorialises their attendance at the event. To do so, these attendees often lug around still or video cameras, and ask a stranger to take their picture. This tends to be inconvenient, especially for the person who has to hold the camera during the entire event. Furthermore, it is not always possible to obtain the desired picture because the person holding the camera does not have it ready when an unpredictable memorable event occurs, such as a home run landing nearby, or because it was not possible to situate camera so as to capture the desired field of view.

One partial solution to these problems, commonly used in amusement parks, required that the event site assign employees to take the picture of each customer as they pass through an entrance area. The employees would then give the customer a numbered tag. Several hours later, the customer would go to a designated area, return the numbered tag, and receive the photographs. These systems, however, were labor intensive and could not provide images of the customer during unpredictable memorable events.

Another partial solution to these problems, also used in amusement parks, focused a camera at a particular location along a ride. The passing of a car would trigger the camera. These systems, however, only worked in applications where each customer would pass through a small and well-defined region, and could not respond to unpredictable memorable events. These systems also did not allow the customer to purchase the picture after they left the area.

Still another partial solution to these problems required that each guest wear a specially designed identifier badge. Cameras at the event site recorded the guests and created electronic images. Software analysed the electronic images to locate and analyse the badges, and used the resulting information to identify individuals. One drawback of these systems, however, is that they required sophisticated software to read the information on the badges. Another drawback of these systems is that they may fail if the customer is not facing the right direction or if the badge is obscured. This drawback can be a particular problem at music concerts where the seating areas are generally poorly lit. Yet another drawback of these devices they raise significant privacy concerns.

Clearly, there is a need for a simple, inexpensive system that can provide souvenir photographs to customers.

SUMMARY OF THE INVENTION

The present invention captures images of a plurality of attendees at an event site, such as a sport stadium, concert hall, and the like. Individuals wanting to receive a copy of a particular image can provide location information, such as their assigned seat number and/or a code associated with the seat number. Embodiments may also ask the user to present event identification information, such as the event's date and time. The present invention uses this information to identify the proper image. Embodiments of the present invention may be adapted for use in a kiosk and to deliver the picture over a computer network, such as the Internet.

Accordingly, one aspect of the present invention is a method of providing souvenir images to event site customers comprising capturing at least one image of an event site, receiving desired location information from the customer, and displaying the at least one image associated with the desired location. The at least one image in some embodiments is associated with an event site location, and may be photograph or video clip taken from a scoreboard display signal or a television broadcast signal.

Another aspect of the present invention is a method for providing souvenir images to a customer, comprising generating a plurality of images having locations associated therewith, receiving a location indicator from a customer, correlating the location indicator with a first image in the plurality of images, and providing the first image to the customer.

Another aspect of the present invention is a system for providing souvenir images, comprising a camera adapted to capture at least one image of an event site, a selection input device adapted to receive a desired location from a customer, a processor adapted to correlate the desired location with the event site location, and an image delivery apparatus adapted to provide the image associated with the desired location to the customer. The at least one image is associated with at least one event site location. In some embodiments, the image delivery apparatus comprises a kiosk operably connected to a printer and a touch-sensitive monitor.

Another aspect of the present invention is a system adapted to provide souvenir images to event site customers. One embodiment of this system comprises a camera adapted to capture a plurality of pictures of an event site, a sensor that correlates the plurality of images with a plurality of seat locations, and a kiosk. The kiosk in this embodiment comprises a ticket reader that receives an assigned seat location from a customer, a display that displays an image in the plurality of images associated with the assigned seat location; a payment receiver that receives a required payment from the customer, and a printer that prints the image associated with the desired seat location in response to the payment receiver receiving the required payment.

One feature and advantage of the present invention is that it provides allows sport arenas and concert halls to provide customized souvenir photographs to their customers using simple, inexpensive equipment. Another feature and advantage of the present invention is that it can easily be adapted to take advantage of any pre-existing image capture equipment at the event site, such as the scoreboard cameras and/or television cameras. These and other features, aspects, and advantages will become better understood with reference to the following description, appended claims, and accompanying drawings.

DETAILED DESCRIPTION

Figure 1A:
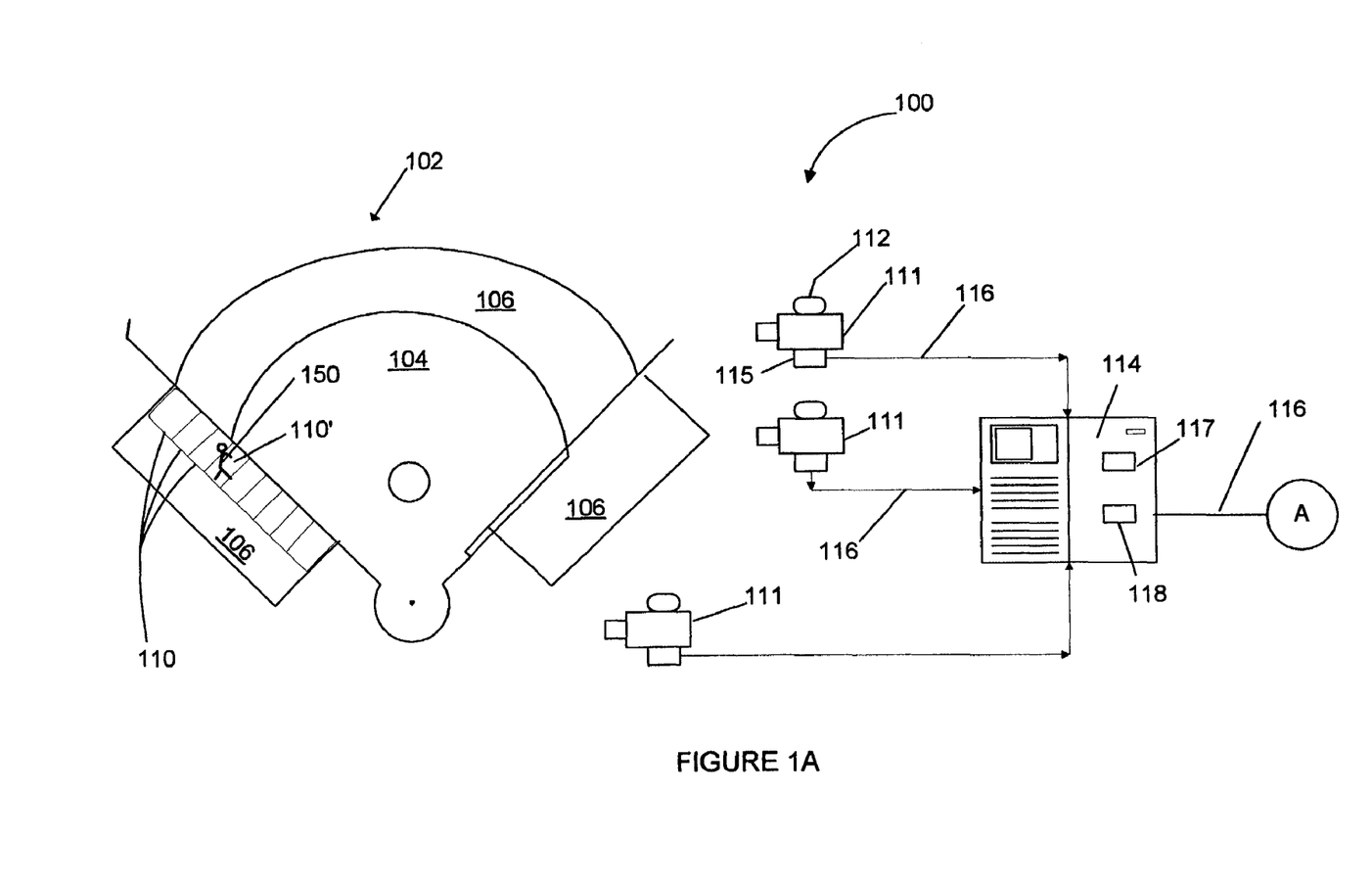
FIG. 1A is a pictorial illustration of a souvenir image capture system embodiment.

FIG. 1A shows an image capture system 100 embodiment suitable for use with the present invention. This figure includes an event site 102, such as a baseball park, having a play field 104 surrounded by a customer seating area ("stands") 106. The stands 106 contain a plurality of numbered seats 110. One of these seats 110' is uniquely assigned to a particular customer 150. Also surrounding the playing field 104 and the stands 106 are several cameras 111 located at known locations. Each camera 111 includes a directional sensor 112 and a network interface 115 that connects the camera 111 to server computer 114 via a communications network 116. The server 114, in turn, includes and provides access to an image database 117 and electronic transaction processing software 118.

Figure 1B:
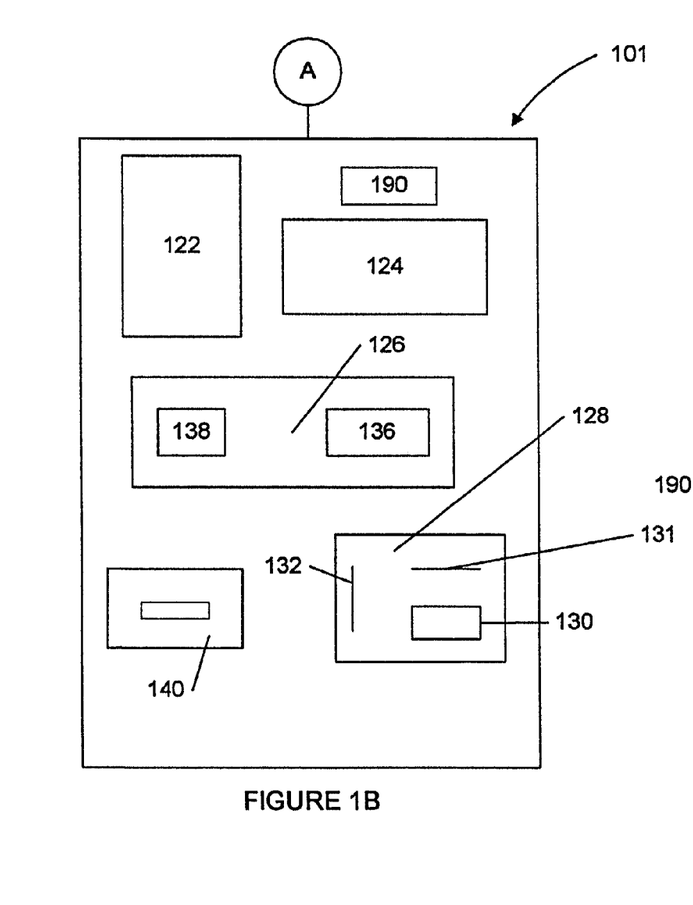
FIG. 1B is a first image delivery system embodiment, which may operably connect to the souvenir image capture system in FIG. 1A at reference mark A.

FIG. 1B shows a kiosk 101 embodiment suitable for delivering the images captured and stored using the image capture system 100. This kiosk 101 includes a video monitor 122 on which information regarding the options associated with the particular transaction being undertaken are displayed to the customer 150; a photo-quality printer 124; an input device 126; a payment acceptor 128 through which paper currency or other forms of payment, such as credit cards, are submitted to the souvenir image capture and delivery system 100 as payment for the image to be dispensed to the customer 150; and a ticket reader 140. The input device 126 in this embodiment comprises an alphanumeric keypad 136 and a trackball-style pointing device 138.

Figure 2:
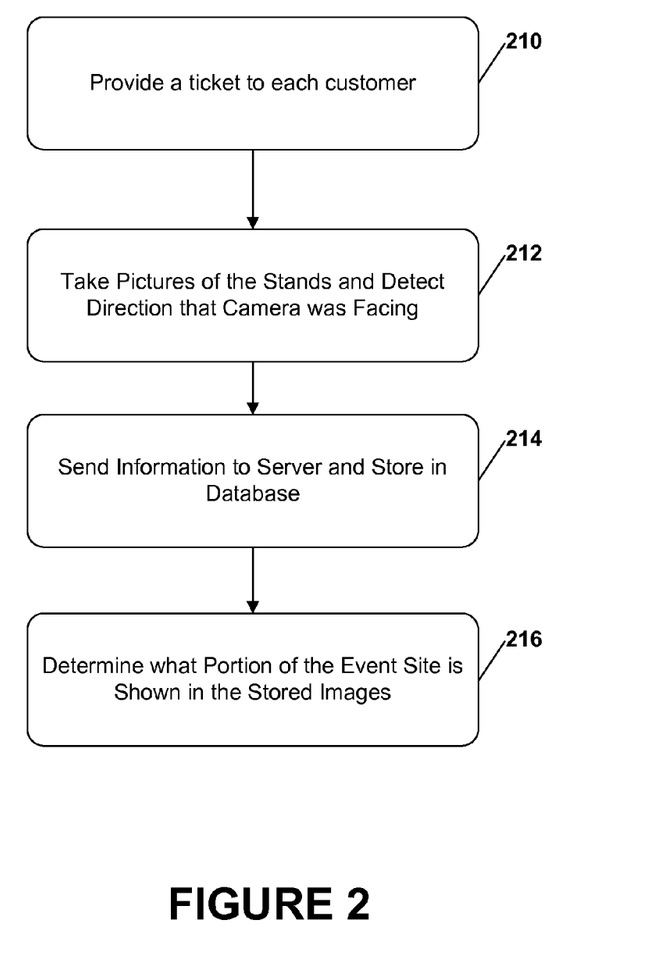
FIG. 2 illustrates one method of using the apparatus in FIG. 1A to capture and store souvenir images.

FIG. 2 is a flow diagram showing the image capture system 100 in operation. At block 210, each customer 150 of the event site 102 is provided with a ticket that he or she may use to gain admission to the event site 102 for a particular event. This ticket includes an indication (e.g., a row number and a seat number) that uniquely defines the customer's assigned seat 110'. This customer 150 is generally expected to sit in the assigned seat 110' during most of the event. The ticket may also include a bar code, or the like, to allow the ticket reader 140 to detect the customer's assigned seat 110' indication.

At block 212, the cameras 111 automatically scan the stands 106 during the event and take several pictures of each numbered seat 110. At block 214, these pictures are electronically sent to the server computer 114 and stored in a database 117. Also in blocks 212 and 214, the sensors 112 send electronic signals to the server 114 that indicate in what direction the camera 111 was pointed when it took the pictures. These signals are also stored in the database 117. At block 216, the server 114 uses the signals from the sensors 112 to determine what portion of the event site 102 is shown in each stored image. That is, the server 114 uses the information from the sensors 112 to correlate each of the images in the database 117 with a particular physical location in the event site 102.

Figure 3:
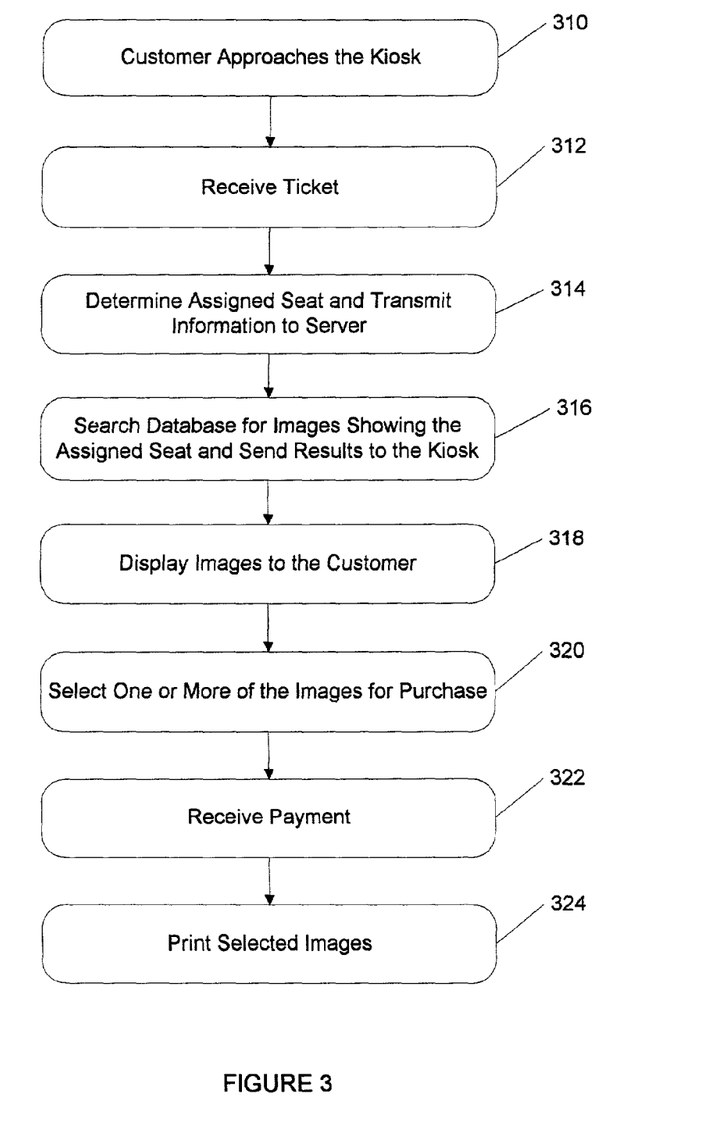
FIG. 3 illustrates one method of purchasing a souvenir photograph using the delivery system in FIG. 1B.

FIG. 3 is a flow diagram showing one method of purchasing a souvenir photograph using the kiosk in FIG. 1B. At block 310, a customer 150 who wishes to purchase a souvenir photograph will approach the kiosk 101. At block 312, the customer 150 will insert their ticket into the ticket reader 140. At block 314, the ticket reader 140 in the kiosk 101 will electronically scan the inserted ticket, using optical character recognition or bar code scanning techniques for example, and will read the assigned seat indicator and/or bar code printed on the ticket. Alternatively, the customer 150 may enter their seat number or other location identification information using the alphanumeric pad 136 and pointing device 138. After receiving the seat identification information, the kiosk 101 will transmit the information to the server 114 using the network 116.

At block 314, some embodiments may also require that the customer enter a security code, such as a random number printed on the customer's ticket stub or a portion of the credit card number used to purchase the ticket, to ensure that the only customer who can view and purchase the images showing a particular seat 110' is the customer to whom to whom that seat is assigned. Embodiments using this feature may be particularly desirable because they will help preserve the customer's privacy.

At block 316, the server 114 will then search the database 117 for any images showing the indicated seat location and will electronically transmit the images back to the kiosk 101. These images in this embodiment may show only the particular seat 110' or may show a group of seats that contains seat 110'. After receiving the image or images, this embodiment will display them to the customer 150 on the monitor 122 at block 318. At block 320, the customer will use the keypad 136 and/or the pointing device 138 to select one or more of the images for purchase. The customer 150 may also use the keypad 136 to enter a personalized message (e.g., "Jack and Jill - World Series Game 7") to be printed along with the image at 324. At block 322, the customer 150 will insert an appropriate amount of money into the kiosk 101 into the payment acceptor 128. At block 324, the kiosk 101 will then print the selected image or images using the printer 124, and give the image or images to the customer 150.

When not in current use by a customer, the kiosk 101 may display promotional information, including text, images, and audio, to attract new customers. The promotional information may include information regarding the current status of ongoing event site events, scores and other statistics of recently completed sporting events, information such as maps and service guides of the sporting venue where the kiosk 101 is located, advertisements of products and services of third-parties who have paid a fee to have the advertisements displayed on the kiosk 101.

Referring again to FIG. 1B, the payment acceptor 128 may be any device capable of receiving payment from the customer 150, and may include one or more of a paper currency acceptor 130, a coin currency acceptor 131, and a credit card reader 132. The customer interface in this embodiment is provided through the alphanumeric pad 136 and the pointing device 138. Alternatively, some embodiments may replace the video monitor 122, the alphanumeric pad, and the pointing device 128 with a touch-sensitive screen whereby the customer may be input any necessary information into the kiosk 101. The ticket reader 140 may be any device capable of reading the customer's assigned seat information off the ticket. Suitable ticket readers include a bar code reader adapted to read a bar code printed on the customer's ticket, an electronic camera coupled to optical character recognition software, and the like.

The server 114 may comprise any general-purpose computer having a central processing unit (CPU) and memory (e.g., random access memory, read only memory, and the like) for managing communication and servicing user requests. The memory in these embodiments contains the necessary programming and data structures to implement the methods described herein, including without limitation, the database program 117 and electronic transaction processing program 118. One suitable embodiment is an iSeries computer running the DB2 database program and the Websphere transaction-processing program, all available from International Business Machines, Inc.

Figure 1C:
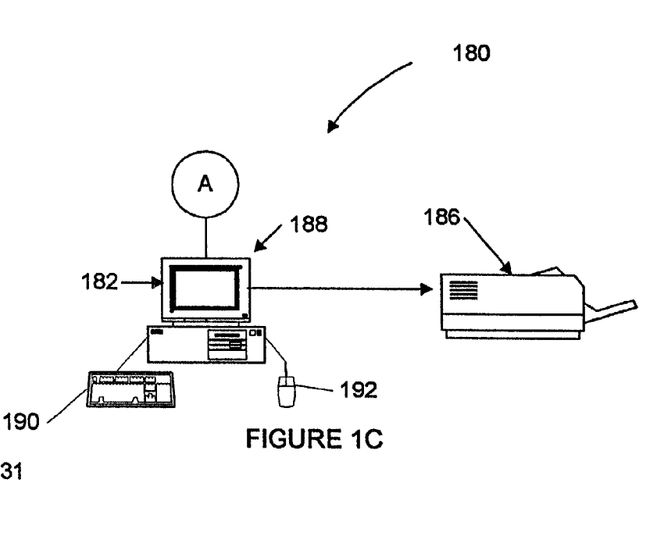
FIG. 1C is a second image delivery system embodiment, which may operably connect to the souvenir image capture system in FIG. 1A at reference mark A.

FIG. 1C shows a home delivery system 180 suitable for delivering the images captured and stored using the image capture system in FIG. 1. This home delivery system 180 embodiment comprises a network access device 182, such as a personal computer, cell phone, personal data assistant, and the like, connected to the Internet; a web-browsing program (not shown); a photo-quality printer 186; a display 188; a keyboard 190; and a mouse or other pointing device 192. Suitable network access devices 182, web-browsing programs, printers 186, displays 188, keyboards 190, and pointing devices 192 are well known and widely available in the art.

Figure 4:
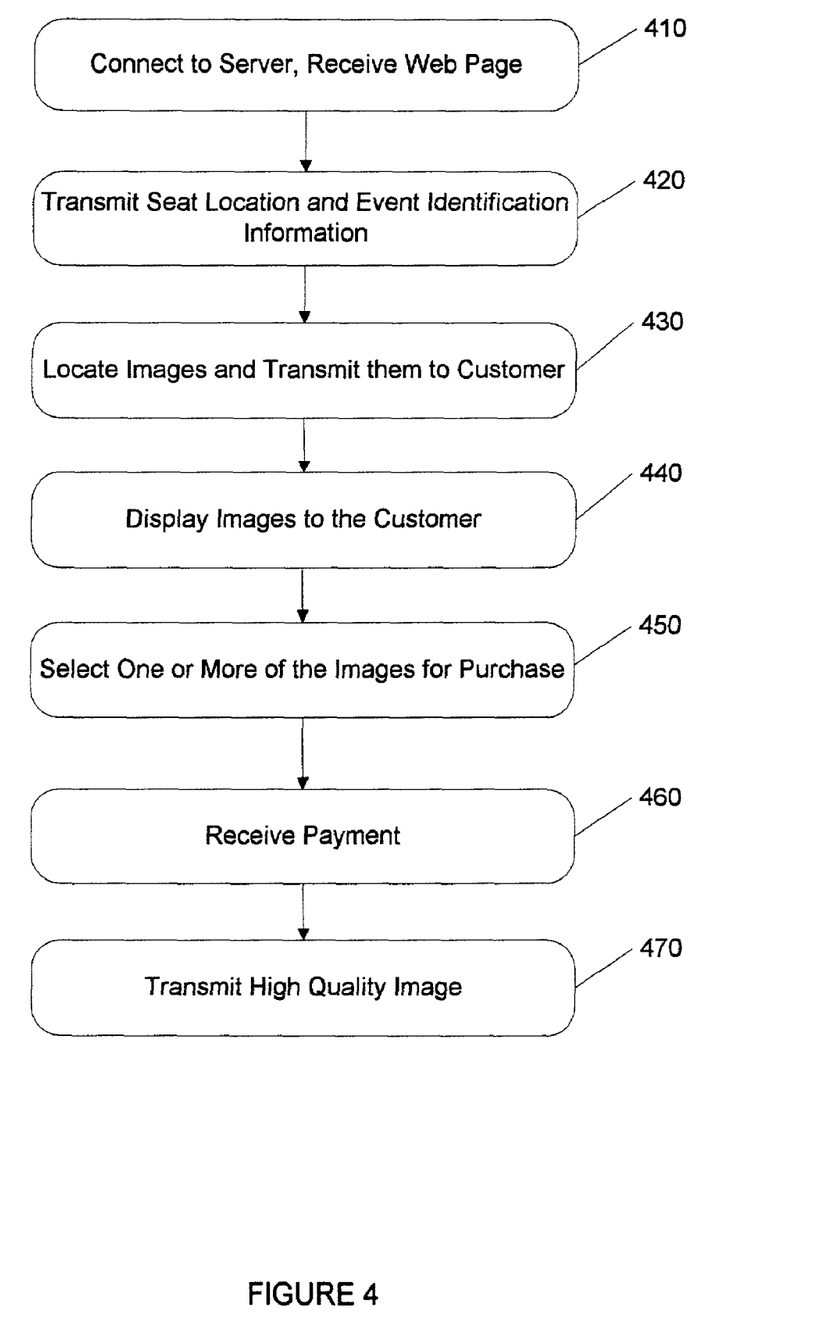
FIG. 4 illustrates a method of purchasing a souvenir photograph using the delivery system in FIG. 1C.

FIG. 4 is a flow diagram showing one method of using the home delivery system 180 in FIGS. 1A and 1C to purchase and deliver souvenir images. At block 410, the customer 150 uses the network access device 182 to contact the transaction processing software 118. The transaction processing software 118 responds by transmitting a web page, which is displayed on the customer's network access device. At block 420, the customer 150 will enter their seat number and event date into the network access device, and then transmit this information to the server computer 114. Some embodiments may also require that the customer enter a security code, such as a random number printed on the customer's ticket stub or a portion of the credit card number used to purchase the ticket, to help preserve the customer's privacy.

At block 430, the server 114 will search the database 116 for any images showing the indicated seat and will electronically transmit the images back to the network access device. The quality of these images may be degraded in some embodiments, such as using a low quality transmission or superimposing a legend (e.g., "SAMPLE"), to encourage the customer 150 to purchase a higher quality copy at block 460.

After receiving the images, the network access program 182 will display the images to the customer 150 at block 440. At block 450, the customer will then select one or more of the images for purchase using the keypad 190 or pointing device 192 attached to the network access device 182. At this time, the customer 150 may also use the keyboard 190 to enter a personalized message (e.g., "2001 Final Four") to be printed with the selected image. At block 460, the customer 150 will enter payment information, such as a credit or debit card number, into the network access device 182 and transmit the payment information to the server 114. At block 470, the server 114 will electronically transmit a high quality version of the images to the network access device 182, which may be printed using the attached printer 186 or stored on a mass storage device (not shown) attached to the network access device 182.

Although the present invention has generally been described as collecting, storing, and delivering conventional electronic images, embodiments of the present invention allow the customer 150 to select and purchase one of a series of a images that, when displayed in sequence, creates the illusion of motion (i.e., a "frame"). These embodiments may be desirable because the customer can select the frame having the best composition (e.g., the frame in which each of their party members are looking at the camera and have their eyes open), and may be particularly desirable when combined the use of television and/or scoreboard video feeds. Other embodiments may allow the customer to select and purchase a full motion video of them at the event site. This video may be encoded using any standard encoding technique, such as MPEG or QuickTime encoding, and either copied to an appropriate medium, such as a CD-ROM disk, or transmitted to the customer's computer or electronic mail address. The video signal may also be encoded using analog techniques and delivered on appropriate media, such as VHS encoding and tapes.

Figure 5:
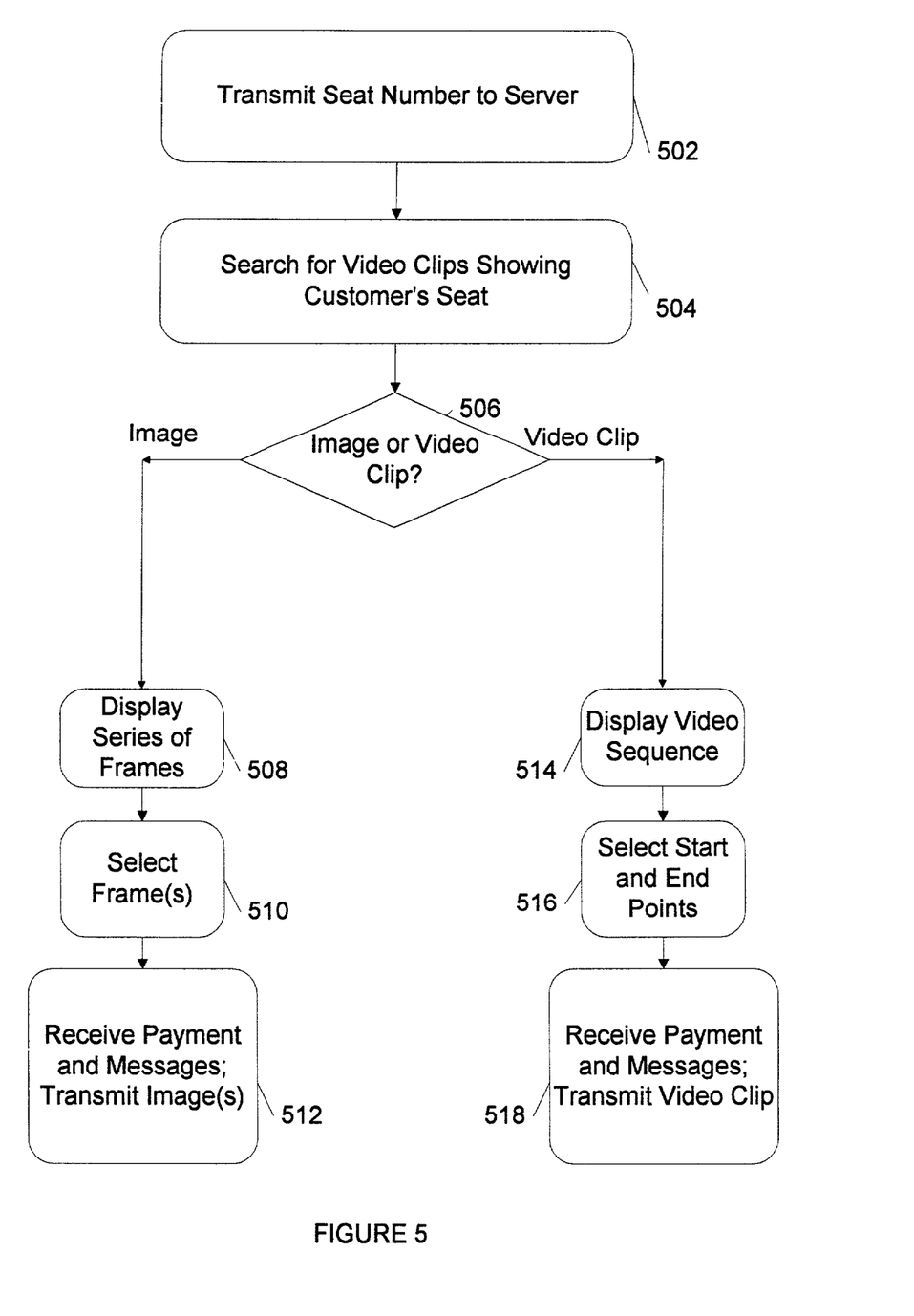
FIG. 5 illustrates one method of using a kiosk to deliver still images and video clips.

FIG. 5 illustrates one method of using the systems in FIG. 1C to deliver still images and video clips. At block 502, the user enters their seat number and transmits this information to the server 114. At block 504, the server 114 searches the database 116 for any video clips showing the indicated seat location and will electronically transmit the images back to the network access device 182. At block 506, the network access device 182 will prompt the customer to select whether they want to purchase a still image or a video clip. If the customer 150 selects still images, the network access device 182 will display a series frames showing the customer. At block 510, the network access device 182 will prompt the customer 150 to select one or more of the frames for purchase. At block 512, the network access device 182 will receive payment from the customer 150, prompt for any personalization messages, and transmit the purchased souvenir image(s) to the network access device 182 using the techniques described in more detail with reference to FIG. 4.

At block 512, if the customer a video clip, the network access device 182 will display any video clips found at block 504. At block 514, the customer will select the portion of the video clip that they wish to purchase. That is, the network access device 182 in this embodiment will prompt the customer to indicate the starting point and the ending point of the desired video clip. At block 516, the network access device 182 will receive payment from the customer 150, prompt for any personalization messages and/or security codes, and transmit the purchased souvenir image(s) to the network access device 182 using the techniques described in more detail with reference to FIG. 4.

Figure 6:
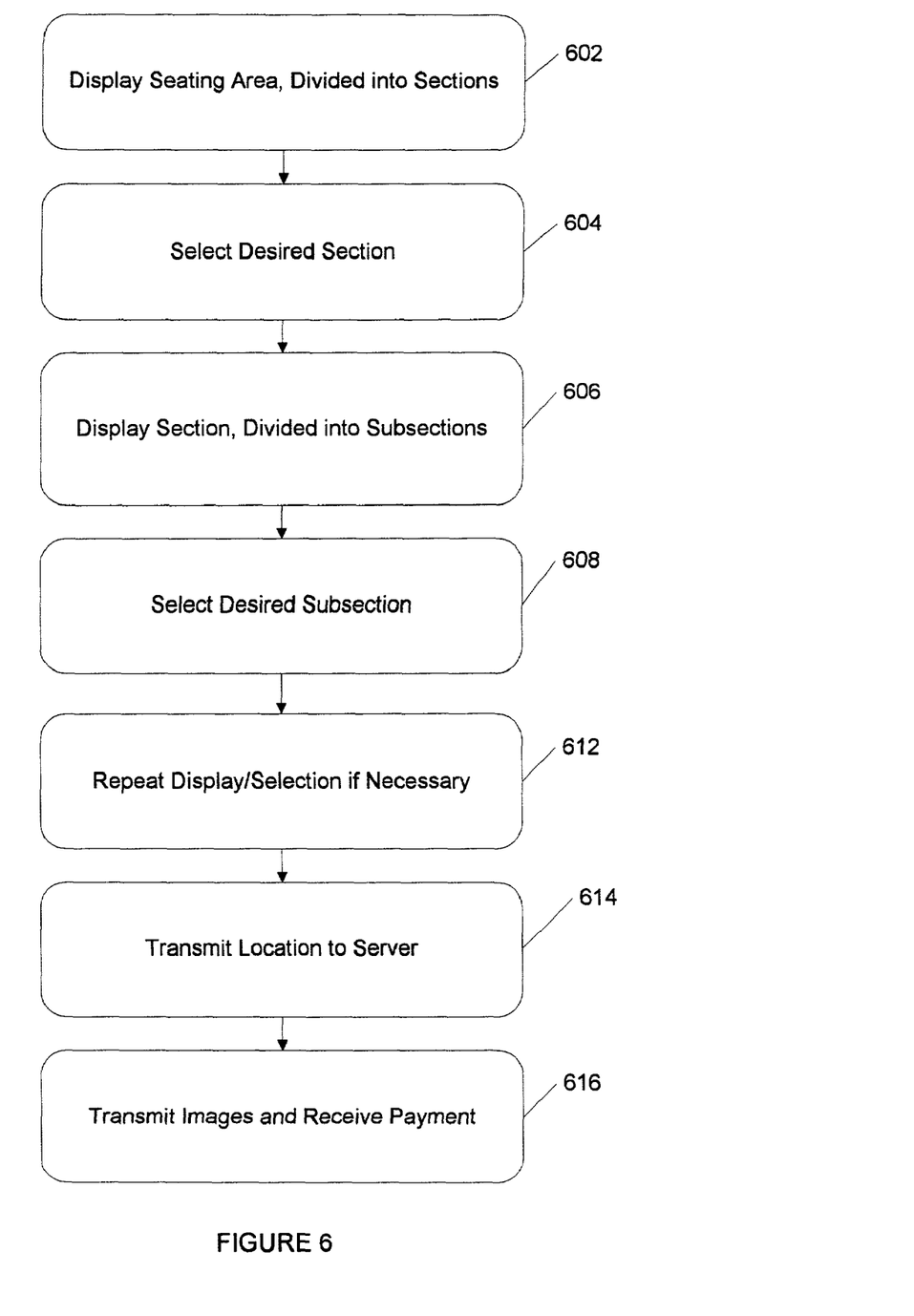
FIG. 6 illustrates one method of determining the customer's location inside an event site.

FIG. 6 illustrates an alternate method of determining the customer's location inside the event site. At block 602, the kiosk 101 or network access device 182 displays a high level map of the customer seating area 106. This map should be divided several sections. At block 604, the customer will select the desired section using, for example, the pointing device 138 or pointing device 192. At block 606, the kiosk 101 or network access device 182 displays a high level map of the section selected in block 604. This section should be divided into several subsections. At block 608, the customer selects the desired subsection using the pointing device 138 or 192. At block 610, the kiosk 101 or network access device 182 displays a high level map of the subsection selected in block 608. This subsection should be divided into several sub-subsections. At block 608, the customer selects the desired subsubsection. Those skilled in the art will recognize that the network access device can repeat this subdivision-selection process at block 612, if necessary, until the network access device only displays the exact area where the customer sat during the event. The kiosk 101 or network access device 182 will then transmit, at block 614, a description of this area to the server computer 116. The server 116, in turn, will then transmit any images showing the selected area using the methods described with reference to FIGS. 2-5. Those skilled in the art will appreciate that these embodiments may be particularly desirable for use in event sites 106 without pre-assigned seating.

Although the present invention has been described in detail with reference to certain examples thereof, it may be also embodied in other specific forms without departing from the essential spirit or attributes thereof. For example, the kiosk 101 described with reference FIGS. 1-4 may allow the customer to enter an electronic mail address via the keypad 136 so that the images can be electronically delivered. These embodiments may be desirable because the kiosk 101 would not use consumable supplies. Embodiments may also allow the customer 150 to enter a postal address should the customer wish to receive a high-quality print of the images. Some kiosk 101 embodiments may replace or supplement the printer 124 with a device 190 (e.g., a CD-RW or DVD-RW drive) capable of writing the images and/or video clips onto a signal bearing medium (e.g., a CD-RW or DVD-RW disk), which would then be given to the customer 150.

In addition, some embodiments of the present invention may be integrated with an event site's television broadcast camera system and/or stadium scoreboard camera system to provide images of unpredictable memorable events, such as the customer 150 catching a home run. That is, many event sites already utilize a plurality of cameras and camera operators to provide live television broadcasts and scoreboard replays. These systems are designed to capture unpredictable memorable moments during the event. The present invention can take advantage of this pre-existing hardware and labor investment to provide images of the customer 150 during the memorable event. These images may be highly desirable because the unpredictable nature of these events makes it difficult for the customer 150 capture an equivalent image using their own camera. These embodiments may also allow the customer to purchase game highlight images, in addition to souvenir images, using the methods described with reference to FIGS. 2-5.

The present invention and components thereof are also capable of being distributed as a program product in a variety of forms, and applies equally regardless of the particular type of signal bearing media used to actually carry out the distribution. Examples of suitable signal bearing media include: recordable type media, such as floppy disks and CD-RW disks, CD-ROM, DVD, and transmission type media, such as digital and analog communications links.

The accompanying figures and this description depicted and described embodiments of the present invention, and features and components thereof. Accordingly, it is desired that the embodiments described herein be considered in all respects as illustrative, not restrictive, and that reference be made to the appended claims for determining the scope of the invention.

I claim:

1. A method of providing souvenir images to event site customers, comprising:
   capturing motion video data during an event, said event being attended by a set of event site customers;
   automatically generating a plurality of images of different event site locations of a plurality of event site locations within an event site from said motion video, wherein each image of said plurality of images is associated with a respective one of said event site locations, wherein each said event site location is occupied during said event by a respective discrete subset of said set of event site customers, each said subset being different and containing at least one and fewer than all respective event site customers of 10 said set of event site customers, each said event site customer occupying only a single respective event site location of said different event site locations during said event;
   receiving, in an automated interactive device, an input from a customer specifying a desired event site location from among said plurality of event site locations, said receiving step being performed after said step of capturing motion video data;
   responsive to said step of receiving a user input, automatically displaying to the 16 customer in said automated interactive device at least one image associated with the desired event site location; and
   responsive to receiving in said automated interactive device a customer confirmation, automatically providing the at least one image to the customer.

2. The method of claim 1, wherein the at least one image comprises an electronic image.

3. The method of claim 1, wherein the motion video data comprises a scoreboard display signal.

4. The method of claim 1, wherein the motion video data comprises a television broadcast signal.

5. The method of claim 1, wherein the at least one image comprises a video clip.

6. The method of claim 1, further comprising receiving money from the customer.

7. The method of claim 1, wherein receiving desired location information from the customer comprises receiving a seat number from the customer.

8. The method of claim 1, wherein providing the at least one image comprises:
   receiving an electronic mail address from the customer; and
   transmitting the first image to the electronic mail address.

9. The method of claim 1, wherein providing the at least one image comprises:
   printing the at least one image.

10. The method of claim 1, wherein providing the at least one image comprises:
    writing the at least one image onto a signal bearing media.

11. The method of claim 1,
    wherein said step of automatically generating a plurality of images automatically generates, for each said event site location, a subset of said plurality of images, each subset comprising multiple said images;
    wherein said step of automatically displaying to the customer in said automated interactive device at least one image comprises automatically displaying to the customer in said automated interactive device the subset of said plurality of images associated with 8 the desired event site location;
    wherein said method further comprises the step of receiving a customer selection of at least one image of said subset of said plurality of images associated with the desired event, said customer selection being received in said automated interactive device, the at least one image selected by said step of receiving a customer selection being automatically provided to the customer by said automatically providing step.

12. The method of claim 1, further comprising the step of receiving in said automated interactive device a personalized message from said customer, wherein the step of automatically providing the at least one image to the customer automatically provides an image containing said personalized message.

13. A system for providing souvenir images, comprising:
a selection input device adapted to receive input specifying a desired location from among of a plurality of locations within an event site from a customer from a set of event site customers attending an event;
a camera adapted to capture motion video data during an event for automatically generating a plurality of images of different locations of said plurality of locations within said event site, wherein each image of said plurality of images is associated with a respective one of said locations within said event site, wherein each said location within said event site is occupied during said event by a respective discrete subset of said set of event site customers attending said event, each said subset being different and containing at least one and fewer than all respective event site customers of said set of event site customers, each said customer attending said event occupying only a single respective one of said locations within said event site during said event;
an image database for storing image data from said motion video data;
a processor adapted to automatically correlate the desired location within said event site received from a customer at said selection input device with at least one image associated with the desired location within said event site, wherein the desired location is received from the customer at said selection input device and correlated by said processor with the at least one image after said camera captures said motion video data; and
an image delivery apparatus adapted to automatically provide the at least one image associated with the desired location to the customer responsive to customer input of a desired location within said event site to said selection input device.

14. The system of claim 13, wherein the image delivery apparatus comprises a kiosk.

15. The system of claim 14, wherein the image delivery apparatus comprises a printer operably connected to the kiosk.

16. The system of claim 14, wherein the image delivery apparatus comprises an optical disk writer operably connected to the kiosk.

17. The system of claim 13, wherein the selection input device comprises at least one of a touch sensitive monitor and a keypad.

18. The system of claim 13, wherein the image delivery apparatus comprises a server computer operably connected to a computer network.

19. The system of claim 13, further comprising a stadium display unit operably connected to the camera, the stadium display unit adapted to display the at least one image to a plurality of event site customers.

20. The system of claim 13, wherein the image comprises at least one of: a video clip, a photograph, a digital photograph, and a digital video clip.

21. A system adapted to provide souvenir images to event site customers, comprising:
a camera adapted to capture a plurality of images of different locations within an event site during an event;
a sensor that automatically correlates each image of the plurality of images with a respective discrete subset of a plurality of subsets of a set of seat locations at said event site, each said subset being different and containing at least one and fewer than all respective said seat locations of said set of seat locations at said event site;
an automated kiosk for interactive use by a customer after said camera has captured said plurality of images, comprising:
an automated document reader that receives a physical document evidencing an assigned seat location from a customer, said automated document reader reading data recorded on said physical document to obtain said assigned seat location, said data being unique to said customer;
a display that automatically displays an image in the plurality of images associated with the assigned seat location responsive to obtaining the assigned seat location using data read by said document reader;
a payment receiver that receives a required payment from the customer; and
a printer that automatically prints the image associated with the desired seat location in response to the payment receiver receiving the required payment.

22. The system of claim 21, wherein said automated kiosk further comprises an interactive input device coupled to said display, wherein said automated kiosk displays a subset of said plurality of images, said subset containing multiple images, each image of said subset being associated with the assigned seat location, and wherein said automated kiosk receives from said customer using said interactive input device a selection of one of said multiple images of said subset, said printer automatically printing the selected image responsive to receiving said selection from said customer.

23. The system of claim 21, wherein said automated kiosk further comprises an interactive input device coupled to said display, wherein said automated kiosk receives 3 from said customer a personalized message using said interactive input device, and wherein responsive to receiving said personalized message, said kiosk automatically prints said personalized message with said image associated with the desired seat location.

24. A non-transitory computer readable medium storing instructions that perform a method of providing souvenir images to event site customers, the method comprising:
1) capturing motion video data during an event, said event being attended by a set of event site customers;
2) automatically generating a plurality of images of different event site locations of a plurality of event site locations within an event site from said motion video, wherein each image of said plurality of images is associated with a respective one of said event site locations, wherein each said event site location is occupied during said event by a respective discrete subset of said set of event site customers, each said subset being different and containing at least one and fewer than all respective event site customers of said set of event site customers, each said event site customer occupying only a single respective event site location of said different event site locations during said event;
3) receiving, in an automated interactive device, an input from a customer specifying a desired event site location from among said plurality of event site locations, said receiving step being performed after said step of capturing 19 motion video data;
4) responsive to said step of receiving a user input, automatically displaying to the customer in said automated interactive device at least one image associated with the desired event site location; and
5) responsive to receiving in said automated interactive device a customer confirmation, automatically providing the at least one image to the customer.

* * * * *